(12) United States Patent
Holmes et al.

(10) Patent No.: US 8,939,513 B2
(45) Date of Patent: Jan. 27, 2015

(54) ROTATING HEAD RESTS

(75) Inventors: Allen W. Holmes, Westland, MI (US);
Aleksandar D. Malusev, Northville, MI (US); Robert A. Wilson, Toledo, OH (US); Brian S. Holder, Livonia, MI (US); Rebecca L. Pennington, Garden City, MI (US); Michael S. Demianenko, Canton, MI (US); Kenneth C. Farkas, Woodhaven, MI (US); Travis Matthew Reel, Marysville, OH (US)

(73) Assignee: Johnson Controls Technology Company, Holland, MI (US)

( * ) Notice: Subject to any disclaimer, the term of this patent is extended or adjusted under 35 U.S.C. 154(b) by 319 days.

(21) Appl. No.: 13/320,182

(22) PCT Filed: May 12, 2010

(86) PCT No.: PCT/US2010/034515
§ 371 (c)(1),
(2), (4) Date: Nov. 11, 2011

(87) PCT Pub. No.: WO2010/132548
PCT Pub. Date: Nov. 18, 2010

(65) Prior Publication Data
US 2012/0062010 A1    Mar. 15, 2012

Related U.S. Application Data

(60) Provisional application No. 61/177,808, filed on May 13, 2009.

(51) Int. Cl.
*A47C 7/36* (2006.01)
*B60N 2/48* (2006.01)

(52) U.S. Cl.
CPC ............... *B60N 2/487* (2013.01); *B60N 2/485* (2013.01); *B60N 2002/4891* (2013.01)
USPC .......................................... 297/408; 297/410

(58) Field of Classification Search
USPC ....................... 297/408, 410, 361.1
See application file for complete search history.

(56) References Cited

U.S. PATENT DOCUMENTS

| 6,074,011 | A  | 6/2000 | Ptak et al. |
| 6,702,377 | B2 | 3/2004 | Nakano      |

(Continued)

FOREIGN PATENT DOCUMENTS

| EP | 1764261 A1 | 3/2007  |
| FR | 2792265 A1 | 10/2000 |

(Continued)

OTHER PUBLICATIONS

International Search Report mailed Nov. 5, 2010 for PCT/US2010/034515.

(Continued)

*Primary Examiner* — Milton Nelson, Jr.
(74) *Attorney, Agent, or Firm* — Fletcher Yoder, P.C.

(57) ABSTRACT

A head rest for a seat assembly includes a rotation mechanism that allows the head rest to rotate with respect to the seat assembly. The rotation mechanism may allow the head rest to incline when in a raised position to provide clearance for an occupant seated in the seat assembly. The rotation mechanism also may allow the head rest to rotate outward from the seat assembly when in a lowered position to displace the occupant with respect to the seat assembly.

20 Claims, 12 Drawing Sheets

(56) References Cited

U.S. PATENT DOCUMENTS

| | | |
|---|---|---|
| 6,811,221 B2 | 11/2004 | Demianenko et al. |
| 7,237,843 B2 | 7/2007 | Clark et al. |
| 7,284,795 B2 | 10/2007 | Sato et al. |
| 7,506,936 B2 | 3/2009 | Saberan |
| 2003/0178878 A1* | 9/2003 | Hoshihara et al. ......... 297/361.1 |
| 2005/0077762 A1 | 4/2005 | Kraemer et al. |
| 2006/0097561 A1 | 5/2006 | Sato et al. |
| 2006/0197366 A1 | 9/2006 | Saberan |
| 2007/0262631 A1 | 11/2007 | Hartlaub |
| 2008/0315653 A1 | 12/2008 | Brunner et al. |

FOREIGN PATENT DOCUMENTS

| | | |
|---|---|---|
| GB | 2221153 A | 1/1990 |
| JP | 2007-82616 | 4/2007 |
| WO | 2005065992 A1 | 7/2005 |

OTHER PUBLICATIONS

Canadian Office Action mailed Jun. 6, 2013.

Japanese Office Action mailed May 14, 2013.

* cited by examiner

ROTATING HEAD RESTS

CROSS REFERENCE TO RELATED APPLICATIONS

This application claims priority from and the benefit of U.S. Provisional Application Ser. No. 61/177,808, entitled "ROTATING HEAD RESTS", filed May 13, 2009, which is hereby incorporated by reference.

BACKGROUND

The invention relates generally to rotating head rests, and more particularly, to rotating head rests that may be employed in vehicle seating assemblies.

Vehicles often include head rests as part of seating assemblies to provide support for an occupant's head. Safety regulations also may mandate a head rest for each seat in a vehicle. When a seat is not used by an occupant, the head rest may be lowered to provide additional storage space or to expand the driver's view. However, the head rest may then need to be raised when the seat is again used by an occupant. Further, after a head rest has been raised from a lowered position, the head rest may not be inclined at a comfortable position for the user.

SUMMARY

In a first embodiment, a vehicle seat assembly includes a seat back that has a contact surface configured to support an occupant, a head rest that has an internal frame, and a rod coupling the head rest to the seat back and configured to elevate the head rest from the seat back to a raised position and to lower the head rest towards the seat back to a lowered position. The vehicle seat assembly also includes a rotation mechanism coupled to the internal frame, disposed around a portion of the rod, and configured to rotate the head rest with respect to the rod. The rotation mechanism is configured to rotate the head rest away from the rod to an extended position towards an occupant space when the head rest is in the lowered position, and to rotate the head rest towards the rod away from the occupant space when the head rest is in the raised position.

In another embodiment, a head rest assembly includes a frame, a trim piece disposed about the frame and having a front surface designed to support an occupant's head, and a rod that has a rotation portion and at least one connection portion configured to fit within a seat back to move the head rest assembly between a raised position where the head rest is elevated above the seat back and a lowered position where the front surface projects from an occupant contact surface of the seat back. The head rest assembly also includes a rotation mechanism coupled to the frame and disposed around the rotation portion to rotate the head rest with respect to the rod between an extended position and an inclined position when the head rest is in the raised position and to place the head rest in the extended position when the head rest is in the lowered position.

In a further embodiment, a head rest assembly includes a frame comprising a plate that limits rotation of the head rest assembly and a wire portion generally defining a shape of the head rest assembly, a trim piece disposed about the frame and having a front surface designed to support an occupant's head, and a rod having a rotation portion extending between two upright portions configured to fit within a seat back to move the head rest assembly between a raised position where the head rest is elevated above the seat back and a lowered position where the front surface projects from an occupant contact surface of the seat back. The head rest assembly also includes a spring clip coupled to the plate. The spring clip includes a bushing portion disposed around the rotation portion of the rod to rotate the head rest with respect to the rod. The spring clip is configured to rotate the head rest with respect to the rod between an extended position and an inclined position when the head rest is in the raised position and to place the head rest in the extended position when the head rest is in the lowered position.

DRAWINGS

DETAILED DESCRIPTION

The present disclosure is directed to head rests that may be employed in vehicle seat assemblies. The head rests can rotate with respect to seat backs of the seat assemblies and can be raised and lowered with respect to the seat backs. In the lowered position, the top of the head rest is located generally even with the top of the seat back, which in turn may increase a driver's field of vision when the seat is not occupied. In the raised position, the head rest is positioned above the seat back to provide support for the head and neck of an occupant who may be seated in the seat.

According to certain embodiments, a head rest may be mounted on a rod that can be raised from and lowered into a seat back to move the head rest between the raised position and the lowered position. The head rest also may include a frame that provides structural support for the head rest and attaches the head rest to the moveable rod. In the lowered position, the head rest can be rotated away from the rod and the seat back so that the head rest projects from the seat back to displace an occupant from the seat, thereby prompting an occupant to raise the head rest. In the raised positioned, the head rest can be rotated back towards the rod and the seat back to allow clearance for an occupant's back, neck, and/or shoulders.

Figure 1:
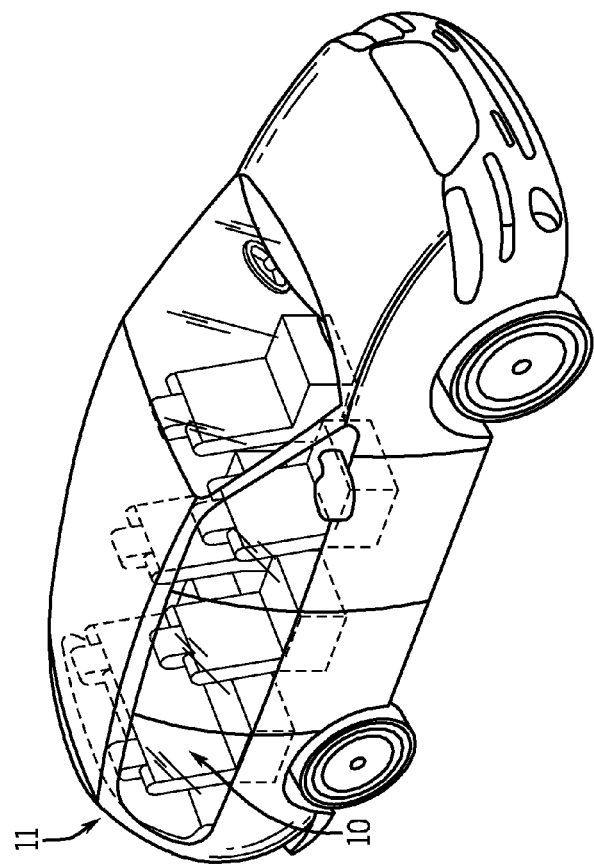
FIG. 1 is perspective view of an embodiment of a vehicle that may employ rotating head rests.

FIG. 1 depicts an exemplary application for a rotating head rest within a vehicle seat assembly 10. According to exemplary embodiments, vehicle seat assembly 10 may be located within the third row of a motor vehicle 11, such as a mini van, full size van, sport utility vehicle, station wagon, or the like. In general, vehicle seat assembly 10 includes a head rest that may be lowered to expand cargo space, expand a driver's view, and/or facilitate removal or storage of vehicle seat assembly 10.

Figure 2:
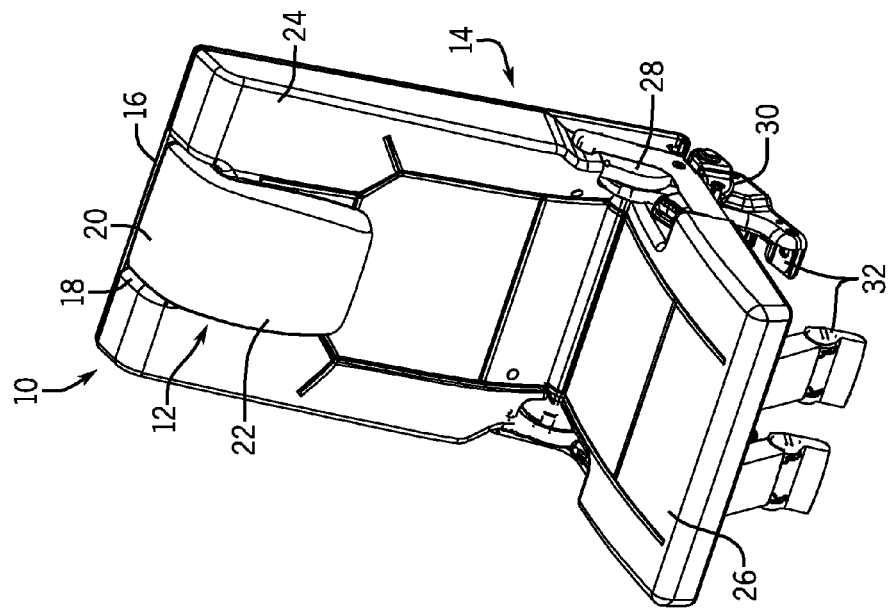
FIG. 2 is a perspective view of an embodiment of a seat assembly with a head rest in a lowered position.

FIG. 2 is a perspective view of vehicle seat assembly 10. Vehicle seat assembly 10 includes a head rest 12 coupled to a seat back 14. As shown, head rest 12 has been lowered to fit within a top portion 16 of seat back 14, reducing the overall height of vehicle seat assembly 10. According to certain embodiments, top portion 16 of seat back 14 may include a cut out section 18 for receiving head rest 12, which may allow head rest 12 to be lowered towards seat back 14 so that a top surface 20 of head rest 12 is generally even with or slightly lower than top portion 16 of seat back 14. In the raised position, shown in FIG. 3, top surface 20 of head rest 12 is elevated above and generally parallel to top portion 16 of seat back 14.

Head rest 12 also includes a contact surface 22 designed to support an occupant's head, when head rest 12 is in the raised position. In the lowered position, contact surface 22 projects from a contact surface 24 of seat back 14, which may displace an occupant from vehicle seat assembly 10, as described further with respect to FIG. 3. Contact surface 24 may be designed to support an occupant's back and shoulders when an occupant is seated within vehicle seat assembly 10.

Vehicle seat assembly 10 also may include a seat base 26 and a recliner mechanism 28 that reclines seat back 14 with respect to seat base 26. A seat belt mechanism 30 also may be included within vehicle seat assembly 10 to secure an occupant within vehicle seat assembly 10. In certain embodiments, vehicle seat assembly 10 may include a lower frame 32 that may be attached to the floor of a motor vehicle.

Figure 3:
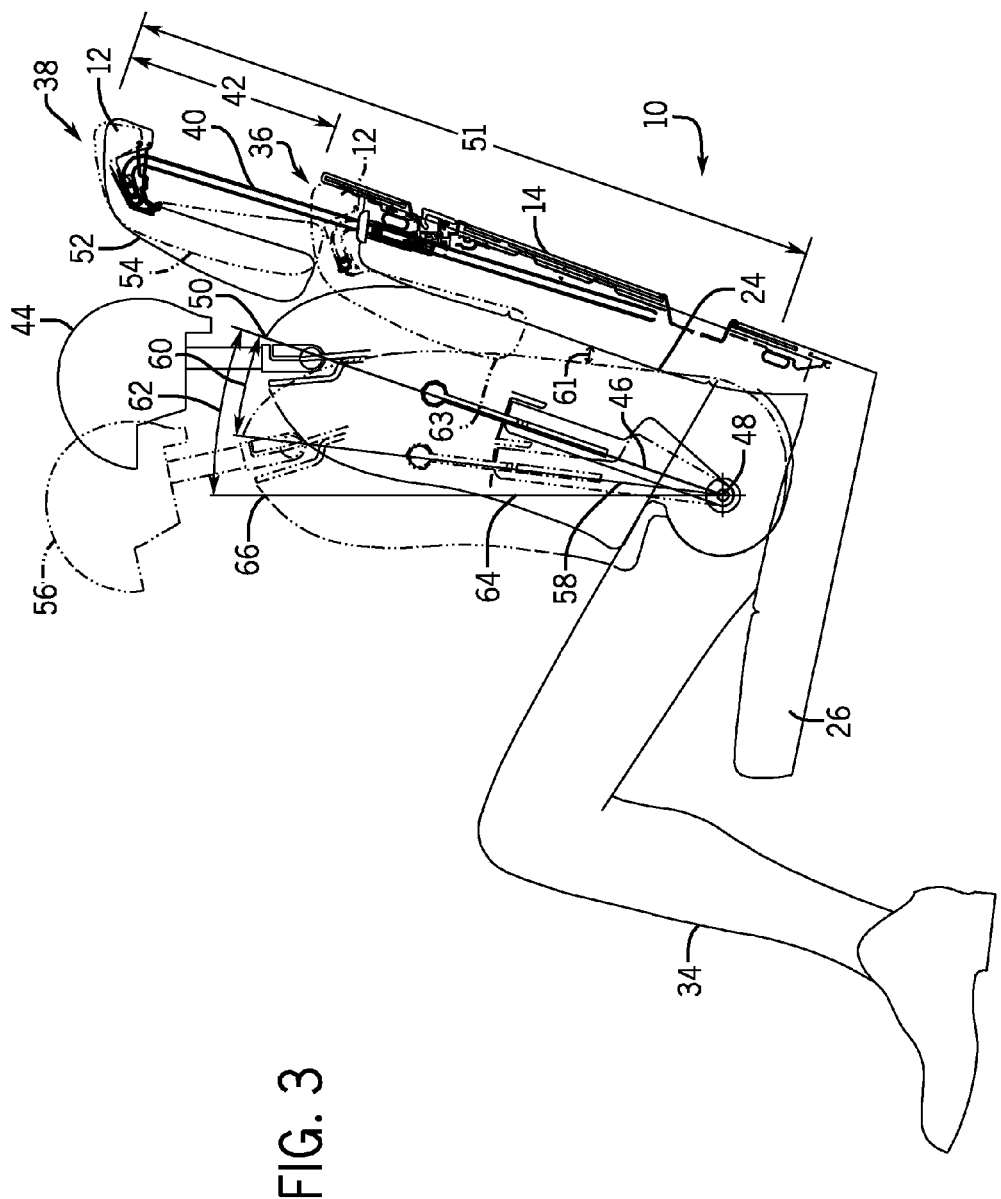
FIG. 3 is a side view of the seat assembly of FIG. 1 depicting the raised position and the lowered position.

FIG. 3 is a side view of the vehicle seat assembly depicting an occupant 34 sitting within vehicle seat assembly 10. As shown in FIG. 3, head rest 12 can be moved between a lowered position 36 and a raised position 38 by adjusting the position of a rod 40. For example, rod 40 can be extended up from seat back 14 to raise head rest 12 to raised position 38, and rod 40 can be lowered into seat back 14 to lower head rest 12 to lowered position 36. According to certain embodiments, head rest 12 may be designed to travel a distance 42 of approximately 255 mm between lowered position 36 and raised position 38. However, in other embodiments, the distance between lowered position 36 and raised position 38 may vary. Further, in certain embodiments, head rest 12 may be designed so that it may be located at one or more intermediate stop positions between lowered position 36 and raised position 38. The intermediate stop positions may allow an occupant to adjust head rest 12 to a position that generally aligns with the position of the occupant's head when occupant 34 is seated within vehicle seat assembly 10.

When head rest 12 is located in raised position 38, occupant 34 may sit within vehicle seat assembly 10 in a reclined position 44 where the occupant's back may rest against contact surface 24 of seat back 14. The position of occupant 34 in the reclined position 44 may be generally represented by a torso line 46 that extends between an occupant's pivot point 48 and a transition point 50 between an occupant's neck and shoulders. Head rest 12 may be designed so that when head rest 12 is in raised position 38, the top of head rest 12 extends at least a minimum distance 51 above pivot point 48 along torso line 46. According to certain embodiments, head rest 12 may extend at least 750 mm above pivot point 48 along torso line 46. More specifically, head rest 12 may be designed to extend approximately 765 to 800 mm above pivot point 48 along torso line 46. As described further below with respect to FIG. 4, when head rest 12 is in the raised position 38, head rest 12 can be rotated between an extended position 52 and an inclined position 54, shown generally by the dashed lines, to provide additional clearance between head rest 12 and an occupant's back and/or shoulders.

When head rest 12 is in lowered position 36, head rest 12 projects outward from seat back 14 to place occupant 34 in a displaced position 56, generally indicated by the dashed lines. According to certain embodiments, head rest 12 may contact the back and/or shoulders of occupant 34 to incline occupant 34 forward with respect to seat back 14. The position of occupant 34 in the displaced position 56 may be generally represented by a torso line 58 that extends between the occupant's pivot point 48 and the transition point 50 between the occupant's neck and shoulders. The amount of displacement of occupant 34 with respect to the reclined position 44 may be measured by a displacement angle 60 that represents the angular change between the torso lines 46 and 58 with respect to pivot point 48. According to certain embodiments, the displacement angle 60 may be approximately 10 to 15 degrees nominal, and all subranges therebetween, when head rest 12 is in lowered position 36. More specifically, the displacement angle 60 may be approximately 12 degrees nominal when head rest 12 is in lowered position 36. In certain embodiments, displacement of occupant 34 when head rest 12 is in the lowered position 16 may ensure compliance with manufacturer and/or government specifications, such as U.S. Federal Motor Vehicle Safety Specification 202A (FMVSS 202A).

The displacement angle 60 also may generally correspond to an angle 61 between contact surface 24 of seat back 14 and the forward-most surface 63 of head rest 12. According to certain embodiments, angle 61 may be approximately 10 to 15 degrees, and all subranges therebetween. More specifically, angle 61 may be approximately 12 degrees.

The displaced position 56 also may produce a torso angle 62 in occupant 34 when occupant 34 is seated in displaced position 56. The amount of torso incline in occupant 34 may be generally represented by a torso line 64 that extends between the occupant's pivot point 45 and a transition point 66 between the occupant's neck and chest. The amount of torso incline may be measured by torso angle 62, which represents the angular change between torso line 46 and torso line 66 with respect to pivot point 48. According to certain embodiments, torso angle 62 may be approximately 19 degrees. As shown, the locations of pivot point 48 and torso lines 46, 58, and 64 and the values of angles 60 and 62 may be representative of the locations and values that would be produced by a person of average size. However, in other embodiments, the locations of pivot point 48 and torso lines 46, 58, and 64 and the values of angles 60 and 62 may vary depending on the size and/or shape of occupant 34.

The displacement of occupant 34 may be intended to prompt occupant 34 to raise head rest 12 from lowered position 36 to raised position 38 when occupant 34 is seated within vehicle seat assembly 10. When head rest 12 is located in raised position 38, head rest 12 may generally align with the occupant's head, which may provide support for the occupant's head. When head rest 12 is located in raised position 20, occupant 34 can move towards the seat back to a reclined position 44 where the occupant's back may rest against seat assembly 10. However, head rest 12 may contact the upper shoulders of the occupant 34 to incline the occupant 34 slightly from the torso line.

Figure 4:
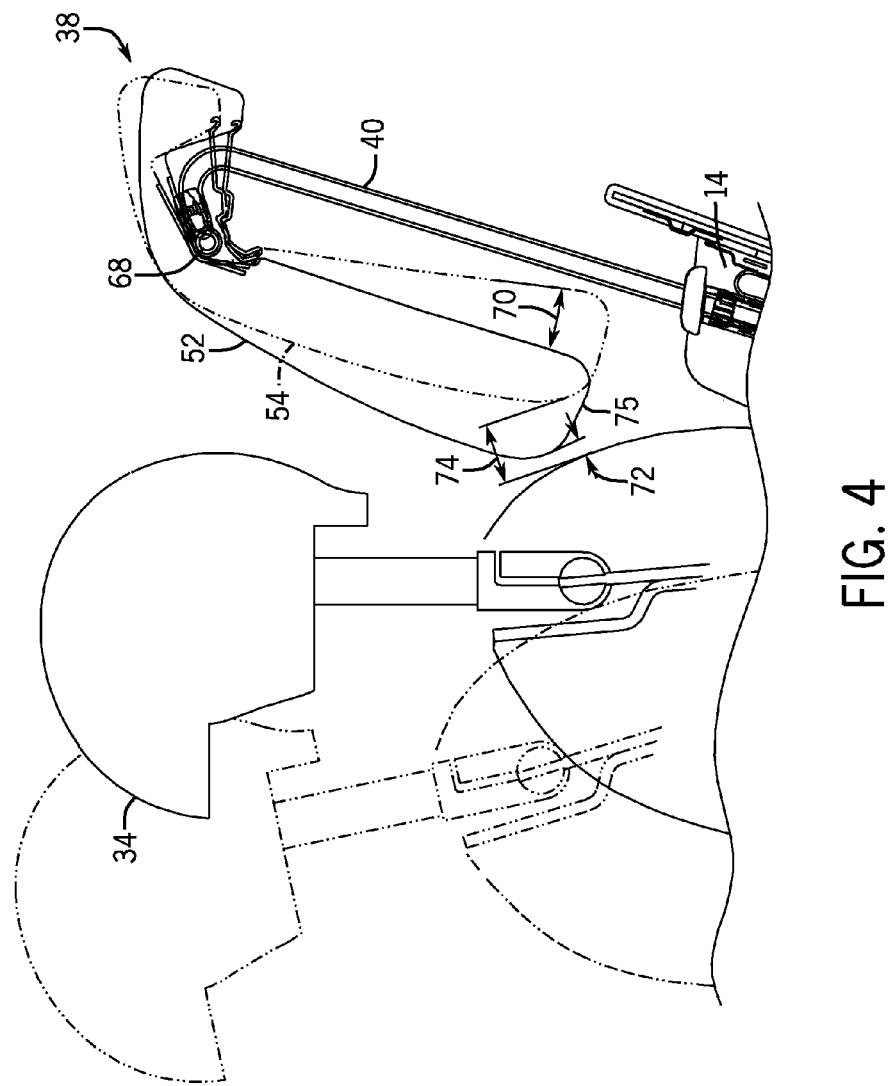
FIG. 4 is a side view of the head rest of FIG. 3 depicting the extended position and the reclined position.

FIG. 4 is an enlarged view of a portion of the vehicle seat assembly of FIG. 3, which shows the rotation of head rest 12 between extended position 52 and inclined position 54. To move between extended position 52 and inclined position 54, head rest 12 rotates about a pivot point 68. The amount of rotation may be measured by an angle 70 that represents the amount of rotation in head rest 12 with respect to pivot point 68. According to certain embodiments, angle 70 may be approximately 10 degrees. Head rest 12 can be rotated by the full rotation amount to place head rest 12 in inclined position 54. Further, head rest 12 may be rotated by smaller amounts to dispose head rest 12 at one or more intermediate position between extended position 52 and inclined position 54.

The rotation of head rest 12 may be designed to provide additional clearance for an occupant's neck, shoulders, and/or head. For example, when head rest 12 is located in extended position 52, a relatively small clearance distance 72 exists between head rest 12 and an occupant's back and/or shoulders. According to certain embodiments, clearance distance 72 may be approximately 9.3 mm. To provide additional clearance between head rest 12 and occupant 34, head rest 12 can be rotated from extended position 52 to inclined position 54. For example, occupant 34 may move head rest 12 manually towards rod 40 to place head rest 12 in inclined position 54. In certain embodiments, the occupant's head may be used to exert pressure on head rest 12 to incline the head rest. Inclined position 54 may provide a relatively larger clearance distance 74 between head rest 12 and an occupant's back and/or shoulders. According to certain embodiments, clearance distance 74 may be approximately 33.1 mm.

From inclined position 54, head rest 12 can be rotated out to extended position 52 to lower head rest 12 from raised position 38 to lowered position 36 (FIG. 3). For example, occupant 34 may move head rest 12 manually out from rod 40 to extend head rest 12 to extended position 52. Occupant 34 may then release a locking mechanism that retains head rest 12 in raised position 38. For example, occupant 34 may actuate a release mechanism, such as a push button, lever, or the like, to allow head rest 12 to move from raised position 38 to lowered position 36. In other embodiments, head rest 12 may be automatically moved to extended position 52 upon actuation of the locking mechanism and manual rotation of head rest 12 may not be needed. For example, a lower portion 75 of head rest 12 may contact seat back 14, which may extend head rest 12 to extended position 52, thereby allowing head rest 12 to lower over seat back 14.

Figure 5:
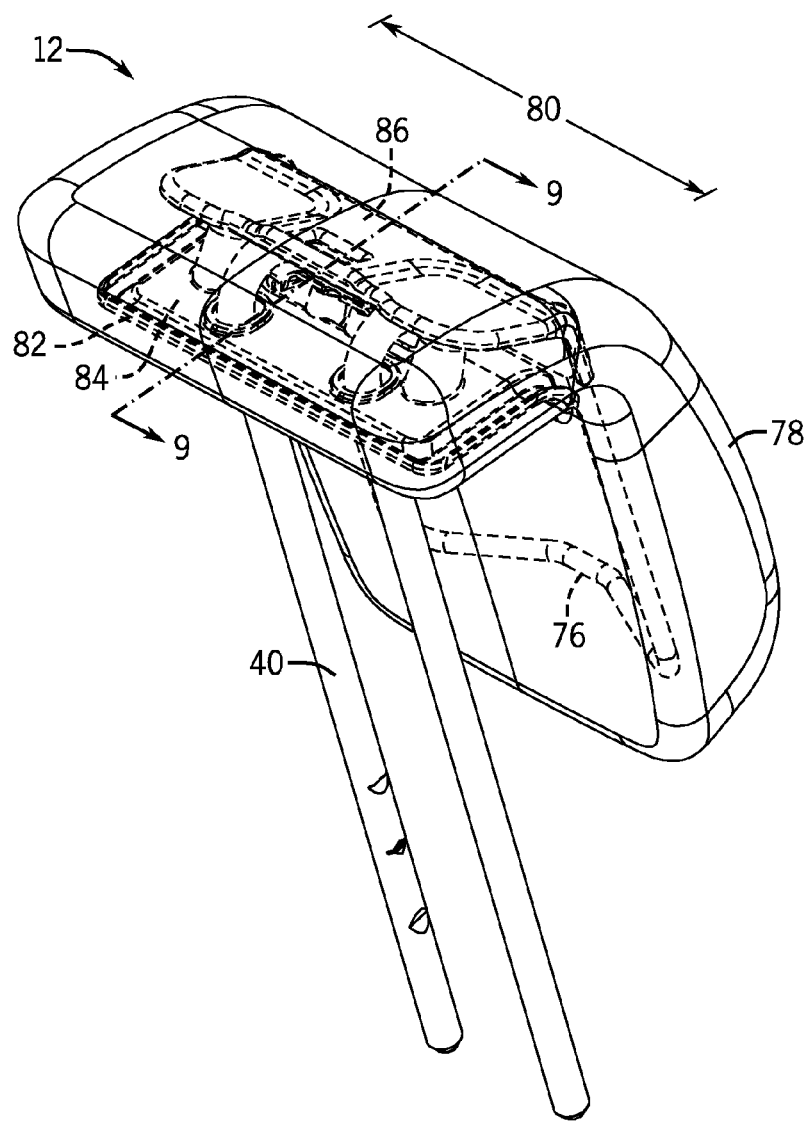
FIG. 5 is a perspective view an embodiment of the head rest.

FIG. 5 is a perspective view of head rest 12. Head rest 12 includes a frame 76 disposed within a trim piece 78. According to exemplary embodiments, trim piece 78 may include foam covered with cloth, leather, or vinyl. Frame 76 may generally be encapsulated or enclosed by the trim piece 78, and trim piece 78 may be designed to absorb forces created by impact to restrain the occupant's head, for example, during a collision. In certain embodiments, trim piece 78 has a width 80 that extends across frame 76. According to certain embodiments, width 80 may be approximately 192 mm.

Frame 76 includes a plate 82 that facilitates rotation of head rest 12 and provides internal support. Covers 84 and 86 also may be disposed around frame 76 to further enhance rotation and/or to provide internal support. Cover 86 may be an optional component that may be omitted in certain embodiments. Head rest 12 is attached to vehicle seat assembly 10 by rod 40. For example, rod 40 may extend through openings in plate 82 and may be enclosed by covers 84 and 86. Trim piece 78 may enclose a portion of rod 40, as well as plate 82 and covers 84 and 86. According to certain embodiments, frame 76 and rod 40 may be constructed of steel. However, in other embodiments, frame 76 and rod 40 may be constructed of plastic, metal, or other suitable material.

Figure 6:
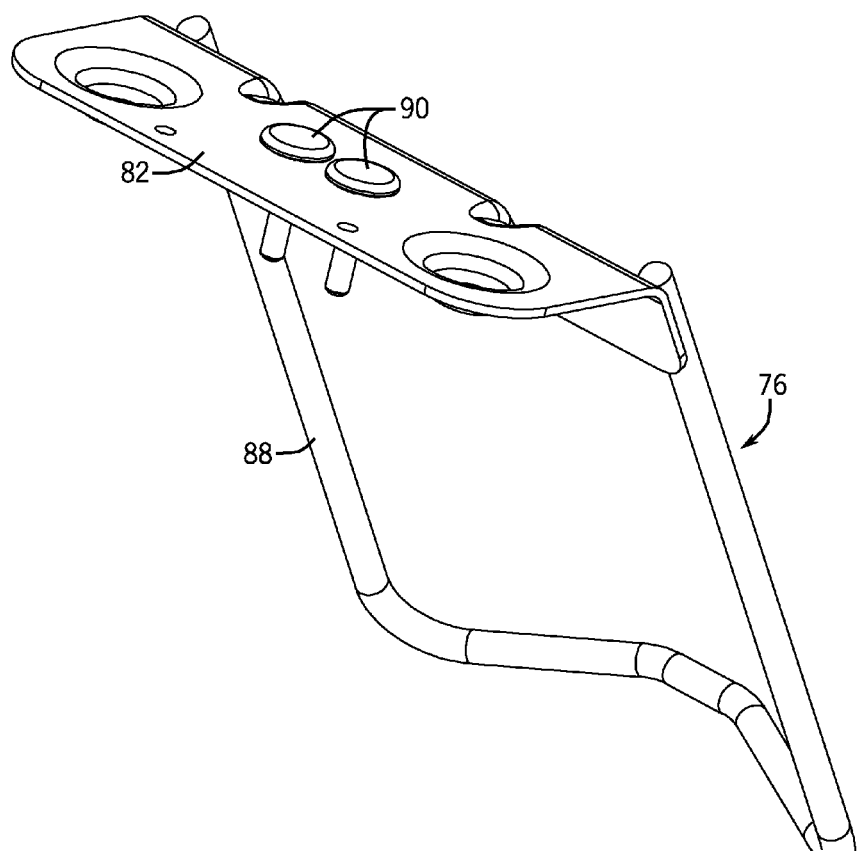
FIG. 6 is a perspective view of a frame that may be employed in the head rest of FIG. 5.

FIG. 6 is a perspective view of frame 76. Frame 76 includes a wire portion 88 that is welded, or otherwise affixed, to plate 82. Plate 82 includes studs 90, such as weld studs, that facilitate attachment of frame 76 to the rod 40.

Figure 7:
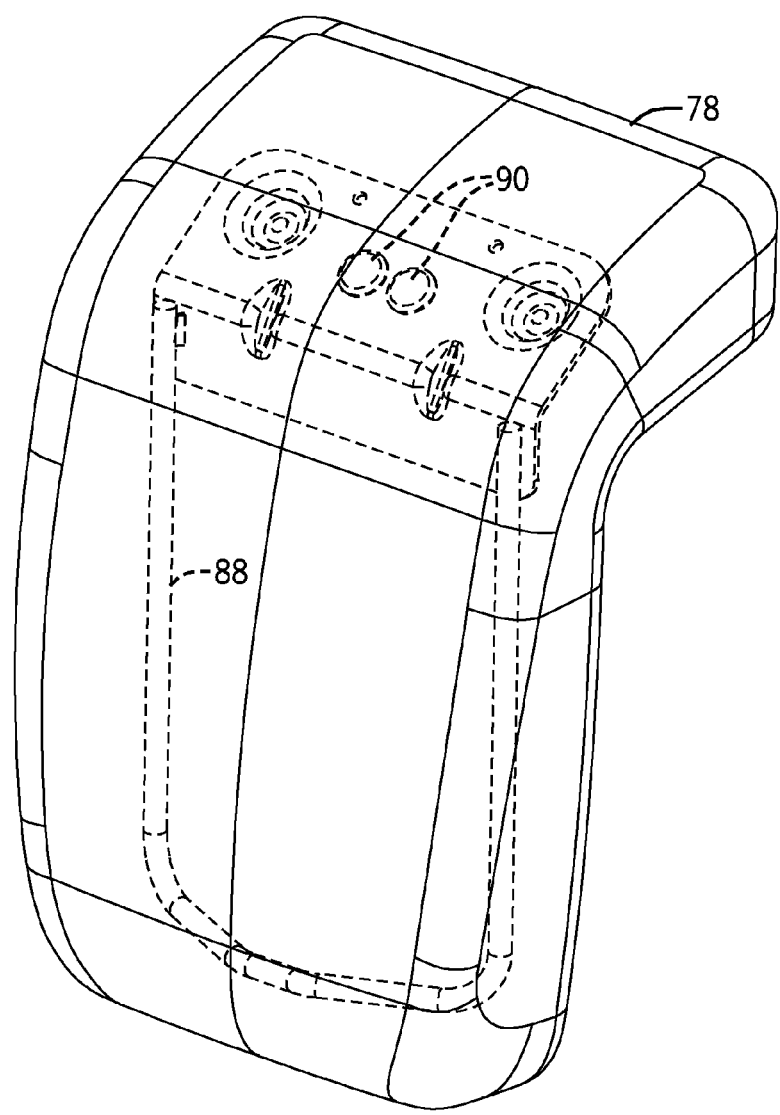
FIG. 7 is a perspective view of the frame of FIG. 6 disposed within a trim piece of the head rest.

As shown in FIG. 7, frame 76 is enclosed by trim piece 78 with a portion of studs 90 extending from trim piece 78. Specifically, plate 82 is disposed within a top portion of trim piece 78 while wire portion 88 extends within a lower portion of the trim piece 78. As described below with respect to FIG. 8, studs 90 may be employed to secure plate 82 to rod 40.

Figure 8:
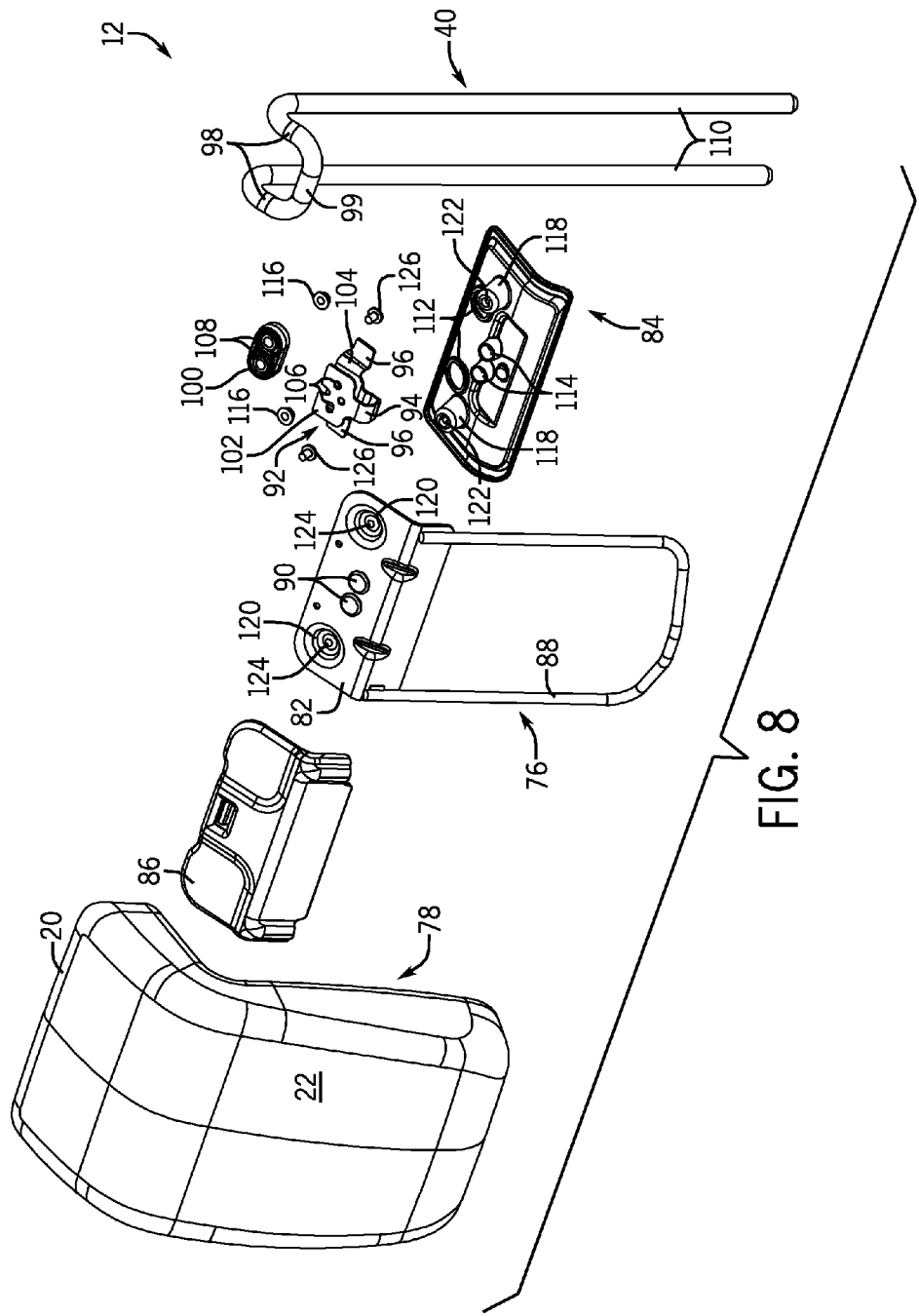
FIG. 8 is an exploded view of the head rest of FIG. 5.

FIG. 8 is an exploded view of head rest 12. In addition to rod 40, trim piece 78, and frame 76, head rest 12 includes a rotation mechanism, such as a spring clip 92 that has a bushing portion 94 that encircles rod 40. Spring clip 92 may include wings 96 that extend outwardly from spring clip 92. When head rest 12 is assembled, wings 96 may be disposed underneath sides 98 of a rotation portion 99 of rod 40. As shown, rotation portion 99 may be a U-shaped section that fits within bushing portion 94 to allow rotation of head rest 12 with respect to rod 40. A spacer 100 also may be inserted within spring clip 92 to provide a desired spacing between a top portion 102 and a bottom portion 104 of spacer 100. The thickness of spacer 100 may be varied to provide the desired spacing, which may depend on factors such as the dimensions of rod 40, among others. Spring clip 92 also may include openings 106 that may generally align with openings 108 of spacer 100 to receive weld studs 90 from plate 82.

Spring clip 92 is attached to plate 82 to allow head rest 12 to rotate with respect to rod 40. For example, spring clip 92 may be placed around rod 40 so that the bushing portion 94 of spring clip 92 encircles the rotation portion 99 of rod 40. Studs 90 of plate 82 may then be inserted through openings 106 of spring clip 92 to attach spring clip 92 to rod 40 and plate 82. When assembled, plate 82 may be located above rod 40 and spring clip 92.

Studs 90 also may be used to secure cover 84 below rod 40 and spring clip 92. Rod 40 may include two connection portions 110 that may be inserted into seat back 14, as shown in FIG. 3. According to certain embodiments, connection portions 110 may be generally straight, upright and parallel lengths of rod 40 that are connected by rotation portion 99. Connection portions 110 can be inserted through openings 112 of cover 44 to dispose rotation portion 99 of rod 40 in between plate 82 and cover 84. Studs 90 can then be inserted through openings 114 of cover 84 to secure cover 84 to plate 82. When assembled, studs 90 can extend through openings 106 of spring clip 92, through openings 108 of spacer 100, and through openings 114 of cover 84 to rotatably secure plate 82 to rod 40. The ends of studs 90 may be spot welded, or otherwise affixed by fasteners, such as nuts 116, to assemble rod 40, plate 82, spring clip 92, and cover 84.

Cover 84 also may include projections 118 that extend upwards from cover 84 to interface with corresponding projections 120 on plate 82. Projections 118 and 120 may separate cover 84 from plate 120 and may provide internal support for head rest 12. Projections 118 and 120 each may include openings 122 and 124, respectively, that can be aligned with one another. Fasteners, such as pan head screws 126, can be inserted through openings 118 and 120 to secure plate 82 to cover 84.

Plate 82, wire 88, cover 84, spring clip 92, and rotation portion 99 of rod 40 may be enclosed within trim piece 78.

Further, in certain embodiments, an optional cover 86 may be placed on top of plate 82 and enclosed within trim piece 78. For example, cover 86 may snap onto portions of frame 76 to attach cover 86 to plate 82. Connection portions 110 of rod 40 may project from trim piece 78 and may be inserted into seat back 14 as shown in FIG. 3 to allow head rest 12 to be raised and lowered with respect to seat back 14.

Figure 9:
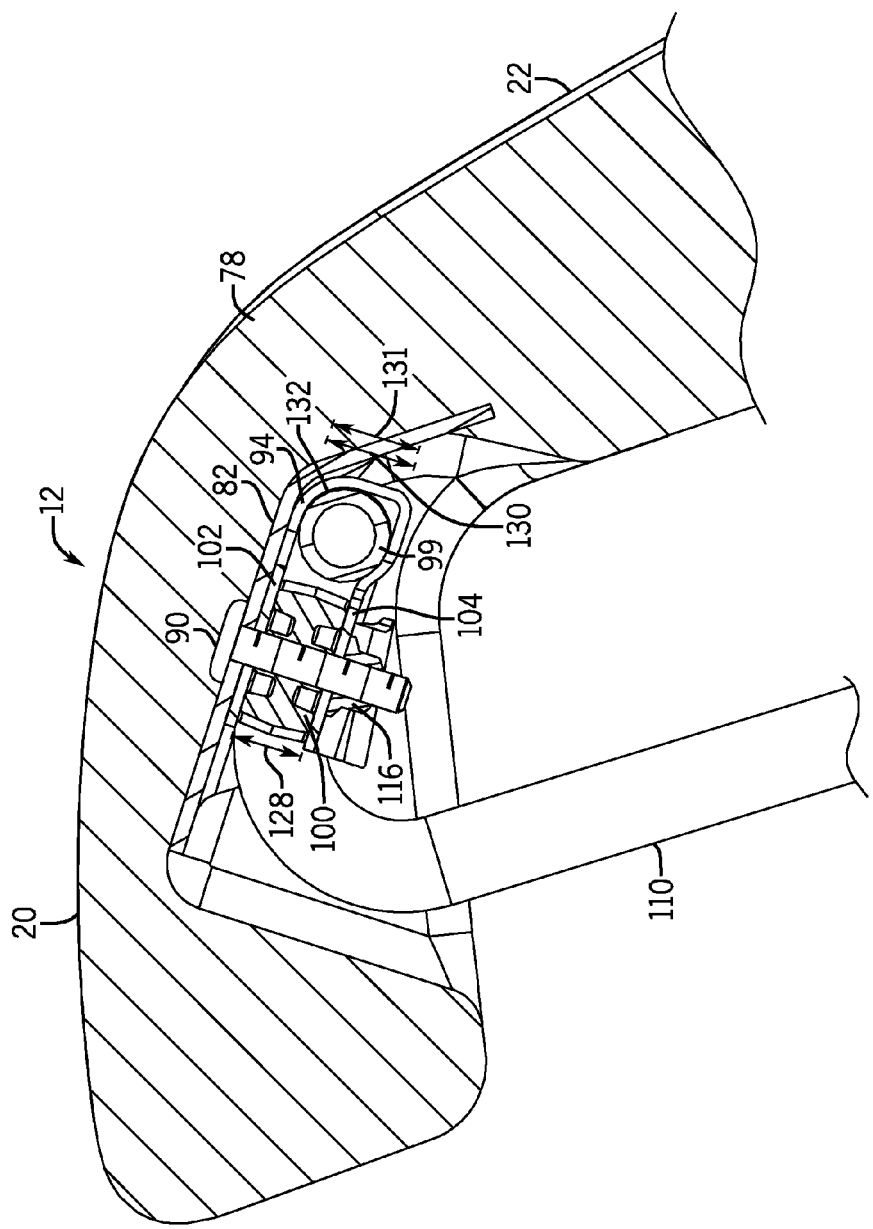
FIG. 9 is a cross-sectional side view of the head rest of FIG. 5.

FIG. 9 is a cross-sectional view of head rest 12 taken along line 9-9 of FIG. 5. As shown in FIG. 9, wire 76 and covers 48 and 52 have been omitted for clarity to depict attachment of spring clip 92, rod 40, and plate 82. Spacer 100 is disposed between the spring clip 92 and has a thickness 128 that separates top portion 102 of spring clip 92 from bottom portion 104 of spring clip 92. According to certain embodiments, thickness 128 may be designed to be slightly less than or approximately equal to the outer diameter of rod 40. Bushing portion 94 of spring clip 92 encircles rotation portion 99 of rod 40 to allow head rest 12 to rotate with respect to rod 40. Bushing portion 94 may have an inner diameter 130 that is approximately equal to or slightly larger than the outer diameter 131 of rod 40.

Rod 40 and spring clip 92 may have a surface coating designed to facilitate rotation of spring clip 92 around rod 40. For example, rod 40 and spring clip 92 may be coated with a film lubricant coating, such as Moly Coat™, commercially available from Continental Research Corporation of St. Louis, Mo. However, in other embodiments, the surface finishes of rod 40 and spring clip 92 may vary. Further, to facilitate rotation, spring clip 92 and rod 40 may be designed to have relatively straight and/or smooth sides. Lubrication also may be applied at an interface 132 between rod 40 and spring clip 92 to facilitate rotation and to impede or prevent noise. According to certain embodiments, a synthetic grease such as Rheogel TEK639, commercially available from Engineered Custom Lubricants of Plymouth, Mich., may be used as lubrication. However, in other embodiments, any suitable lubricant may be employed.

Studs 90 of plate 82 extend through spring clip 92 and spacer 100, and are secured by nuts 116. According to certain embodiments, nuts 116 may be spot welded, or otherwise affixed, to studs 90. Further, nuts 116 may be designed to withstand a certain amount of torque. For example, in certain embodiments, nuts 116 may be designed to withstand approximately 5 to 7 Newton meters, and all subranges therebetween. Studs 90 also may be designed to withstand a certain amount of torque. For example, in certain embodiments, studs 90 may be designed to withstand approximately 4 to 6 Newton meters, and all subranges therebetween.

Figure 11:
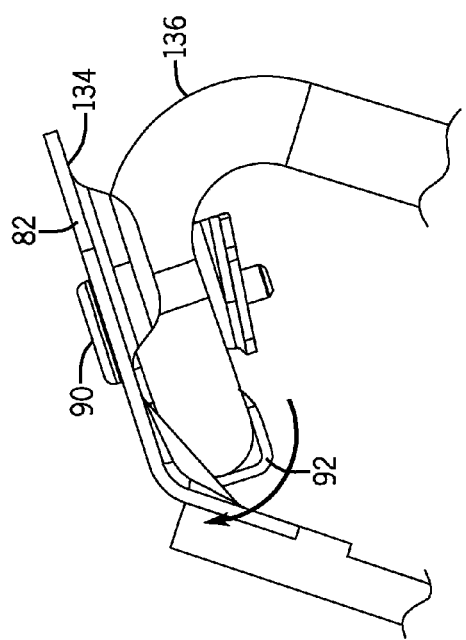
FIG. 11 is a side view of a portion of the head rest of FIG. 5 in the extended position with the trim piece removed.
Figure 10:
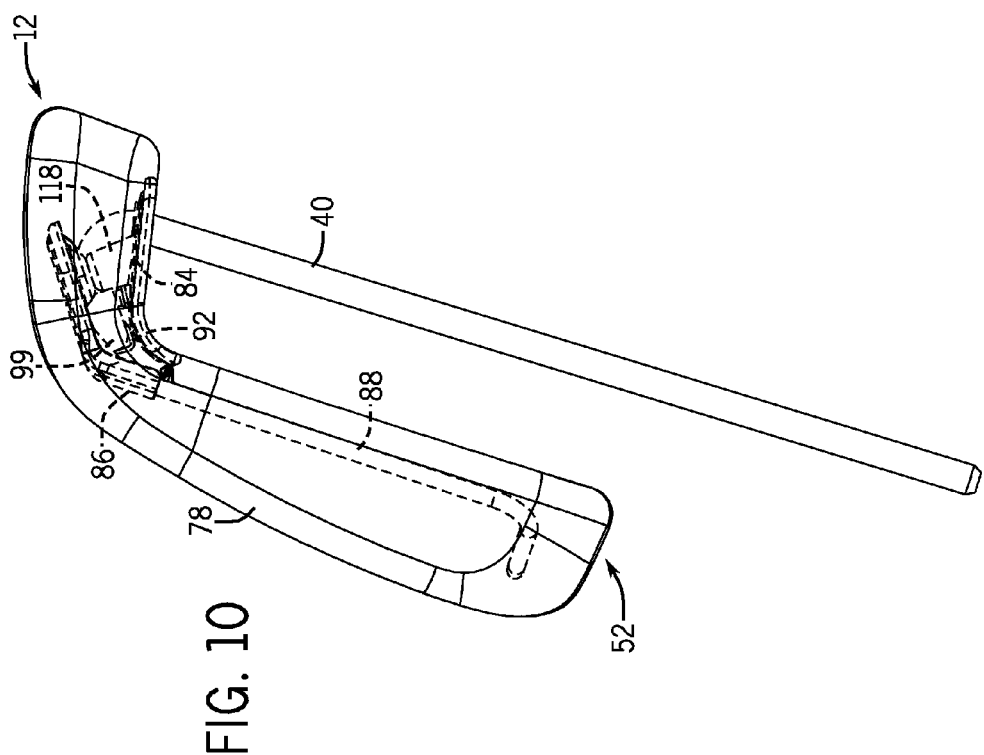
FIG. 10 is a side view of the head rest of FIG. 5 in the extended position.

FIGS. 10 to 13 depict rotation of head rest 12 with respect to rod 40. As shown in FIGS. 10 and 11, head rest 12 is spaced from rod 40 in extended position 52. Specifically, head rest 12 can rotate away from rod 40, as generally shown by the arrow, to extended position 52 until a tip 134 of plate 82 contacts the top side 136 of rod 40. Tip 134 may contact top side 136 of rod 40 to inhibit further rotation of head rest 12 away from rod 40. As described above with respect to FIG. 4, extended position 52 allows head rest 12 to be moved from raised position 38 to lower position 66 by providing enough clearance for head rest 12 to move over the top portion 16 (FIG. 2) of seat back 14.

When head rest 12 is initially moved from lowered position 36 to raised position 38, head rest 12 is located in extended position 52, as shown in FIGS. 10 and 11. However, as noted above with respect to FIG. 4, extended position 52 may not provide sufficient clearance for an occupant's head and/or shoulders to allow an occupant to sit within seat assembly 10 comfortably. Accordingly, head rest 12 can be rotated towards rod 40 to inclined position 54, as shown in FIGS. 12 and 13.

Figure 13:
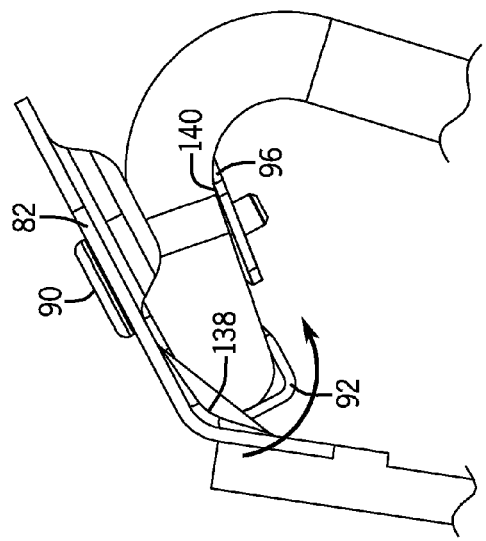
FIG. 13 is a side view of a portion of the head rest of FIG. 5 in the inclined position with the trim piece removed.
Figure 12:
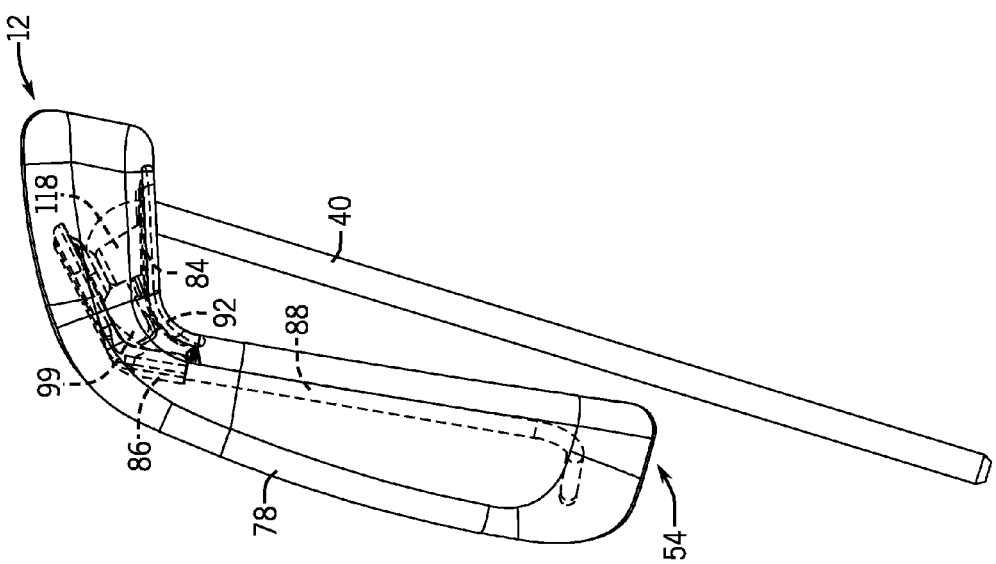
FIG. 12 is a side view of the head rest of FIG. 5 in the inclined position.

FIGS. 12 and 13 depict head rest 12 in inclined position 54 where head rest 12 has been moved towards rod 40, as shown generally by the arrow. Rod 40 and/or spring clip 92 may provide a positive stop that inhibits rotation of head rest 12 past inclined position 54. For example, head rest 12 may be rotated toward rod 40 until an underside 138 of plate 82 contacts spring clip 92. Head rest 12 also may be rotated towards rod 40 until a top side 140 of the spring clip wings 96 contact rod 40. Underside 138 of plate 82 and/or spring clip wings 96 may contact rod 40 to inhibit further rotation of head rest 12 toward rod 40.

Figure 14:
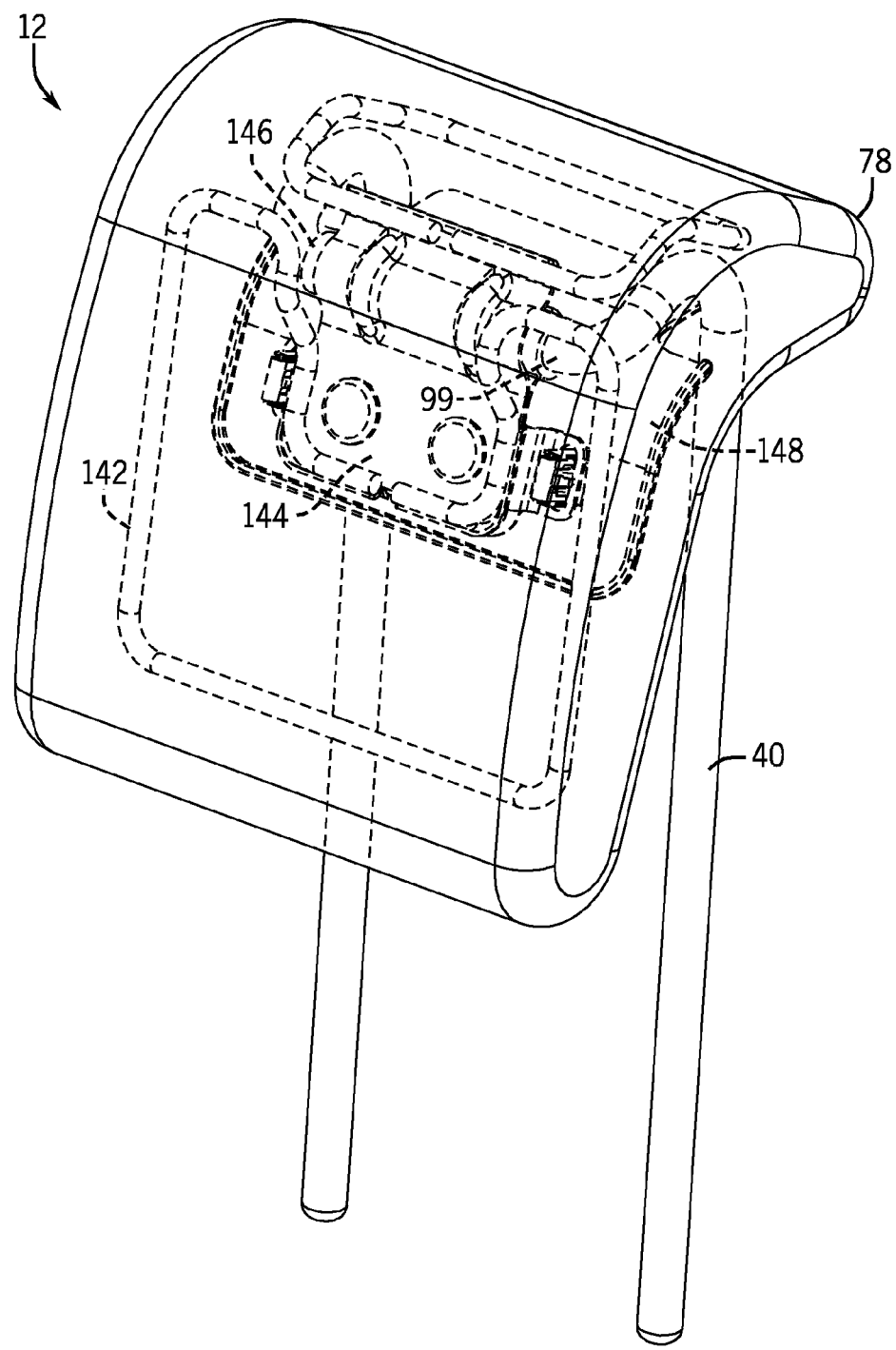
FIG. 14 is a perspective view of another embodiment of a head rest.
Figure 15:
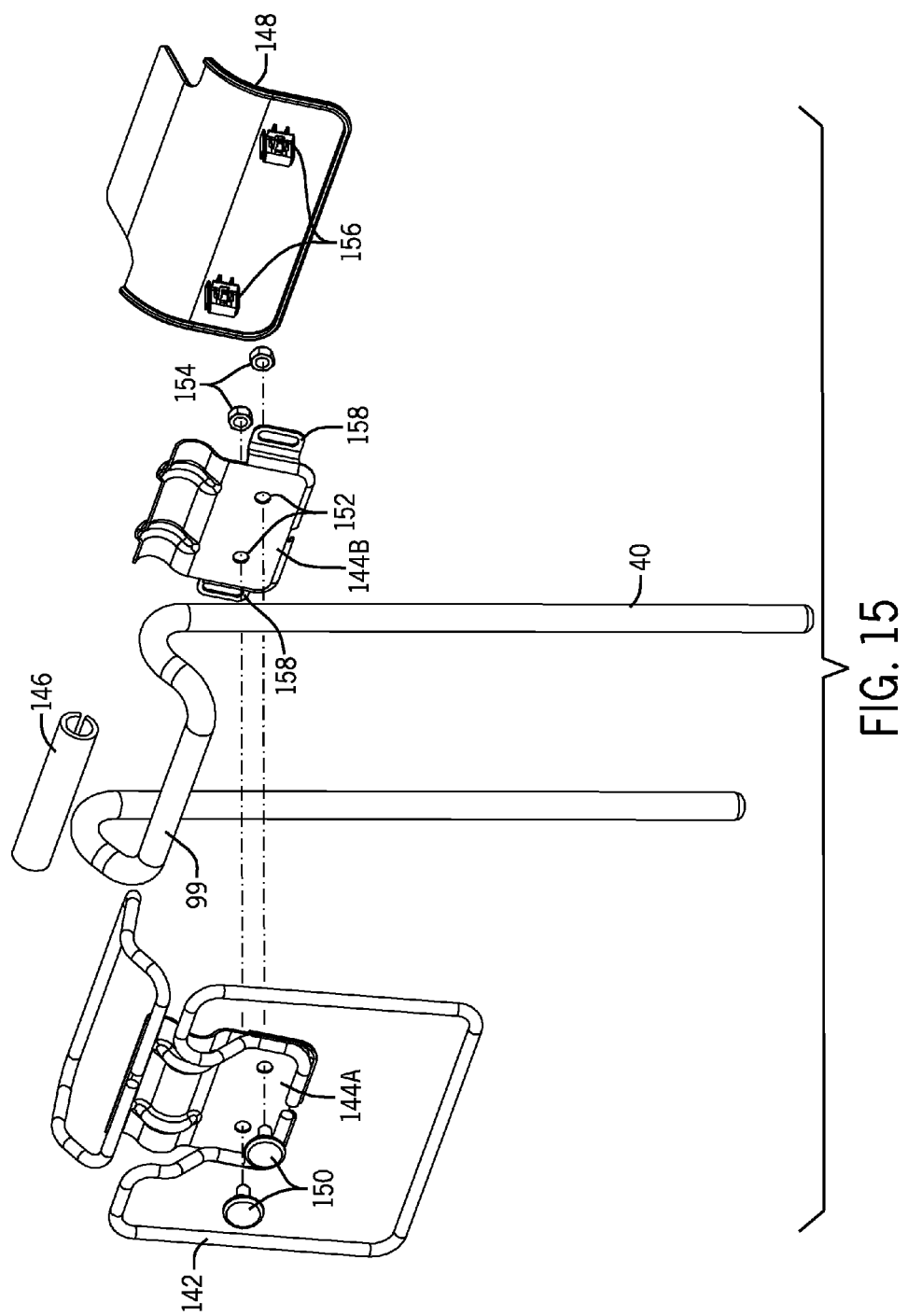
FIG. 15 is an exploded view of the head rest of FIG. 14.

FIGS. 14 and 15 illustrate another embodiment of head rest 12. Similar to the head rest 12 depicted in FIGS. 5 to 13, this embodiment of head rest 12 may include a frame 142 that is enclosed within trim piece 78. However, instead of employing a spring clip, frame 142 may be welded or otherwise affixed to a bracket 144 that encircles a rotation mechanism, such as a bushing 146. Bushing 146 is disposed around rotation portion 99 of rod 40 to allow rotation of head rest 12 with respect to rod 40. According to certain embodiments, bracket 144 may include a two-piece assembly disposed above and below bushing 146 and rod 40. A cover 148 also may be disposed below the bushing 146 and rod 40 to provide internal support for head rest 12. Cover 148 and bracket 144 may be snapped, or otherwise joined together, to attach cover 148 and bracket 144 to rod 40 and bushing 146. Similar to the head rest 12 depicted in FIGS. 5 to 13, this embodiment of head rest 12 may rotate around rod 40 from extended position 52 to inclined position 54.

FIG. 15 is an exploded view of the embodiment of head rest 12 shown in FIG. 14. When assembled, bushing 146 encircles rotation portion 99 of rod 40. Bracket 144 can be disposed around bushing 146 to allow rotation of head rest 12 with respect to rod 44. Bracket 144 may include a top portion 144A, which is affixed to frame 142, and a lower portion 144B, which is designed to mate with top portion 144A. Top portion 144A may include studs 150 that may project from bracket 144 and which may be inserted through openings 152 within lower portion 144B. Fasteners, such as nuts 154 may be used to attach top portion 144A to lower portion 144B via studs 150. Lower portion 144B may then be clipped, or otherwise attached, to cover 148. For example, clips 156 may project from cover 148 and may be designed to fit within openings 158 of lower portion 144B.

While only certain features and embodiments of the invention have been illustrated and described, many modifications and changes may occur to those skilled in the art (e.g., variations in sizes, dimensions, structures, shapes and proportions of the various elements, mounting arrangements, use of materials, orientations, etc.) without materially departing from the novel teachings and advantages of the subject matter recited in the claims. For example, in other embodiments, the geometry of spring clip 92, rod 40, bushing 146, and/or frames 76 and 142 may vary. Further, in certain embodiments, additional components, such as fasteners, brackets, and the like, may be included. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle seat assembly, comprising:
   a seat back having a contact surface configured to support an occupant;
   a head rest having an internal frame;
   a rod coupling the head rest to the seat back and configured to elevate the head rest from the seat back to a raised position and to lower the head rest towards the seat back to a lowered position; and
   a rotation mechanism coupled to the internal frame, disposed around a portion of the rod, and configured to rotate the head rest with respect to the rod, wherein the rotation mechanism is configured to rotate the head rest away from the rod to an extended position towards an occupant space when the head rest is in the lowered position, and to rotate the head rest towards the rod to an inclined position away from the occupant space when the head rest is in the raised position;
   wherein the seat back comprises a cut out section configured to receive a top portion of the head rest when the head rest is in the lowered position.

2. The vehicle seat assembly of claim 1, wherein the rotation mechanism comprises a spring clip having a bushing portion that encircles a rotation portion of the rod, and the spring clip is configured to contact the rod in the inclined position to inhibit rotation of the head rest towards the rod.

3. The vehicle seat assembly of claim 1, wherein the head rest is configured to project outwards from the contact surface of the seat back to contact the occupant and to incline the occupant forward with respect to the seat back when the head rest is in the lowered position.

4. The vehicle seat assembly of claim 1, wherein the rod is configured to dispose a top surface of the head rest above and generally parallel to a top portion of the seat back when the head rest is in the raised position and to dispose the top surface of the head rest generally even with the top portion of the seat back when the head rest is in the lowered position.

5. The vehicle seat assembly of claim 1, wherein the rotation mechanism is configured to rotate the head rest by at least approximately 10 degrees with respect to the rod.

6. The vehicle seat assembly of claim 1, wherein an angle between a forward-most surface of the head rest in the extended position and the seat back is at least approximately 12 degrees when the head rest is in the lowered position.

7. The vehicle seat assembly of claim 1, comprising a seat base coupled to the seat back and a recliner mechanism configured to recline the seat back with respect to the seat base.

8. A head rest assembly, comprising:
   a frame;
   a trim piece disposed about the frame and having a front surface designed to support an occupant's head;
   a rod having a rotation portion and a pair of connection portions configured to fit within a seat back to move the head rest assembly between a raised position wherein the head rest is elevated above the seat back and a lowered position wherein the front surface projects from an occupant contact surface of the seat back, wherein the rotation portion comprises a U-shaped portion that connects the pair of connection portions; and
   a rotation mechanism coupled to the frame and disposed around the rotation portion to rotate the head rest with respect to the rod between an extended position and an inclined position when the head rest is in the raised position and to place the head rest in the extended position when the head rest is in the lowered position.

9. The head rest assembly of claim 8, wherein the frame comprises a plate that is coupled to the rotation mechanism and wherein the plate is configured to contact the rod in the elevated position to inhibit rotation of the head rest away from the rod.

10. The head rest assembly of claim 8, wherein the rotation mechanism comprises a spring clip having a bushing portion that encircles the rotation portion.

11. The head rest assembly of claim 10, wherein the spring clip is configured to contact the rod in the inclined position to inhibit rotation of the head rest towards the rod.

12. The head rest assembly of claim 8, wherein the rotation mechanism comprises a bracket disposed around a bushing.

13. A head rest assembly, comprising:
    a frame comprising a plate that limits rotation of the head rest assembly and a wire portion generally defining a shape of the head rest assembly;
    a trim piece disposed about the frame and having a front surface designed to support an occupant's head;
    a rod having a rotation portion extending between two upright portions configured to fit within a seat back to move the head rest assembly between a raised position wherein the head rest is elevated above the seat back and a lowered position wherein the front surface projects from an occupant contact surface of the seat back; and
    a spring clip coupled to the plate and comprising a bushing portion disposed around the rotation portion of the rod to rotate the head rest with respect to the rod, wherein the spring clip is configured to rotate the head rest with respect to the rod between an extended position and an inclined position when the head rest is in the raised position and to place the head rest in the extended position when the head rest is in the lowered position.

14. The head rest assembly of claim 13, wherein the spring clip is configured to contact the rod in the inclined position to inhibit rotation of the head rest towards the rod.

15. The head rest assembly of claim 13, wherein the plate comprises weld studs extending through a top portion and a bottom portion of the spring clip to couple the plate to the spring clip.

16. The head rest assembly of claim 15, comprising a spacer disposed between the top portion and the bottom portion of the spring clip to separate the top portion and the bottom portion of the spring clip from one another.

17. The head rest assembly of claim 16, wherein the spacer comprises a thickness approximately equal to an outer diameter of the rod.

18. The head rest assembly of claim 13, wherein the bushing portion of the spring clip comprises an inner diameter approximately equal to an outer diameter of the rod.

19. The head rest assembly of claim 13, comprising a lubricant disposed between the bushing portion of the spring clip and the rotation portion of the rod.

20. The head rest assembly of claim 13, wherein the spring clip and the rod each comprise a film lubricant surface finish.

* * * * *